(12) United States Patent
Kao et al.

(10) Patent No.: US 12,160,013 B2
(45) Date of Patent: Dec. 3, 2024

(54) ROBOT USING LIMITING DEVICE FOR LOCKING BATTERY

(71) Applicants: Futaijing Precision Electronics (Yantai) Co., Ltd., Yantai (CN); HON HAI PRECISION INDUSTRY CO., LTD., New Taipei (TW)

(72) Inventors: Chen-Ting Kao, New Taipei (TW); Chi-Cheng Wen, New Taipei (TW); Yu-Sheng Chang, New Taipei (TW); Chih-Cheng Lee, New Taipei (TW); Chiung-Hsiang Wu, New Taipei (TW); Sheng-Li Yen, New Taipei (TW); Yu-Cheng Zhang, New Taipei (TW); Chang-Ju Hsieh, New Taipei (TW); Chen Chao, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 18/582,844

(22) Filed: Feb. 21, 2024

(65) Prior Publication Data
US 2024/0194999 A1    Jun. 13, 2024

Related U.S. Application Data

(62) Division of application No. 17/719,524, filed on Apr. 13, 2022, now Pat. No. 11,942,652.

(30) Foreign Application Priority Data

Oct. 14, 2021 (CN) .......................... 202111198416.5

(51) Int. Cl.
*H01M 50/249* (2021.01)
*B25J 19/00* (2006.01)
(Continued)

(52) U.S. Cl.
CPC .......... *H01M 50/249* (2021.01); *B25J 19/00* (2013.01); *F16M 13/02* (2013.01); *E05D 3/18* (2013.01); *H01M 2220/20* (2013.01)

(58) Field of Classification Search
CPC ......... E05D 3/18; E05D 15/30; E05D 15/165; H01M 50/249; H01M 2220/20; B25J 19/00; F16M 13/02
(Continued)

(56) References Cited

U.S. PATENT DOCUMENTS 5,479,993 A    1/1996    Bojar

*Primary Examiner* — Alfred J Wujciak
(74) *Attorney, Agent, or Firm* — ScienBiziP, P.C.

(57) ABSTRACT

A robot includes a limit device and an energy storehouse, the limiting device may lock or loosen a battery opened in the energy storehouse, the limiting device includes a first connecting member, a transmission rod, and a second connecting member. The first connecting member includes a first main body portion and two first connecting elements arranged at intervals. The two first connecting elements are respectively connected to the first main body. The transmission rod includes a first end and a second end arranged at intervals. The first end penetrates through one of the two first connecting elements. The second end penetrates through the other one of the two first connecting element. The second connecting member includes two indexing buckles arranged at intervals, each of the indexing buckles includes a first limiting groove and a second limiting groove.

8 Claims, 5 Drawing Sheets

(51) Int. Cl.
*E05D 3/18* (2006.01)
*F16M 13/02* (2006.01)

(58) Field of Classification Search
USPC .............. 248/213.1, 288.11, 291.1, 292.14; 16/289, 290, 306, 308
See application file for complete search history.

ROBOT USING LIMITING DEVICE FOR LOCKING BATTERY

TECHNICAL FIELD

The subject matter relates to the field of mechanical automation, in particular to a robot using a limiting device.

BACKGROUND

Companies use robots to replace labor to improve work efficiency and reduce the consumption of fossil fuels. Batteries are used to provide energy for robots. However, because the robot models on the market are not uniform, it is difficult to design the battery compartments of different models of robots.

BRIEF DESCRIPTION OF THE DRAWINGS

Implementations of the present disclosure will now be described, by way of embodiments, with reference to the attached figures.

DETAILED DESCRIPTION

Figure 1:
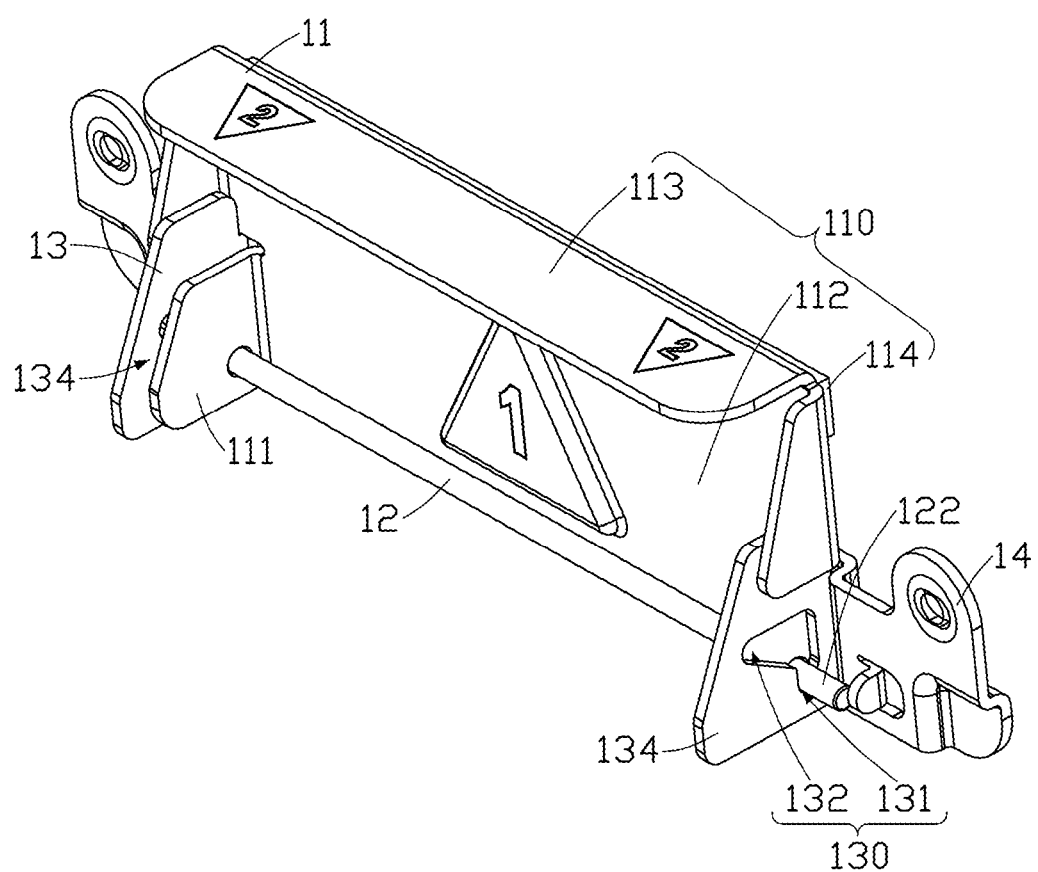
FIG. 1 is a structural view of a limit device according to the present disclosure.
Figure 2:
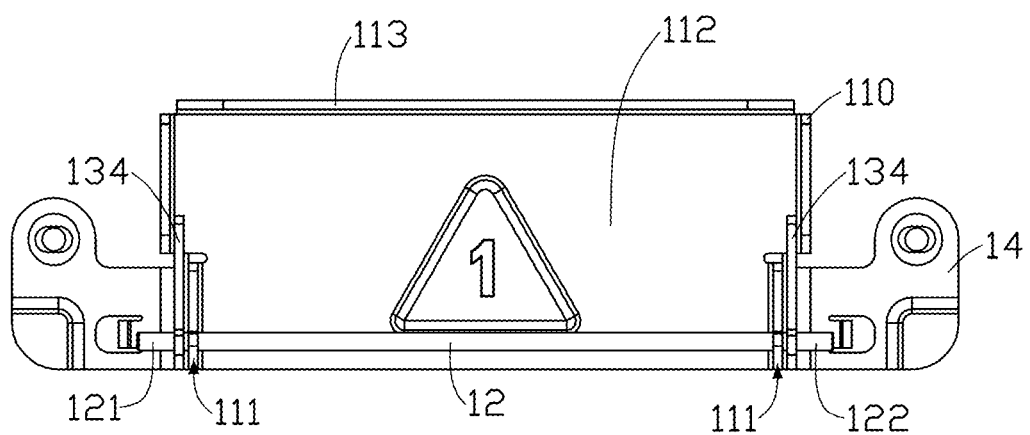
FIG. 2 is a frontal view of the limit device shown in FIG. 1.
Figure 3:
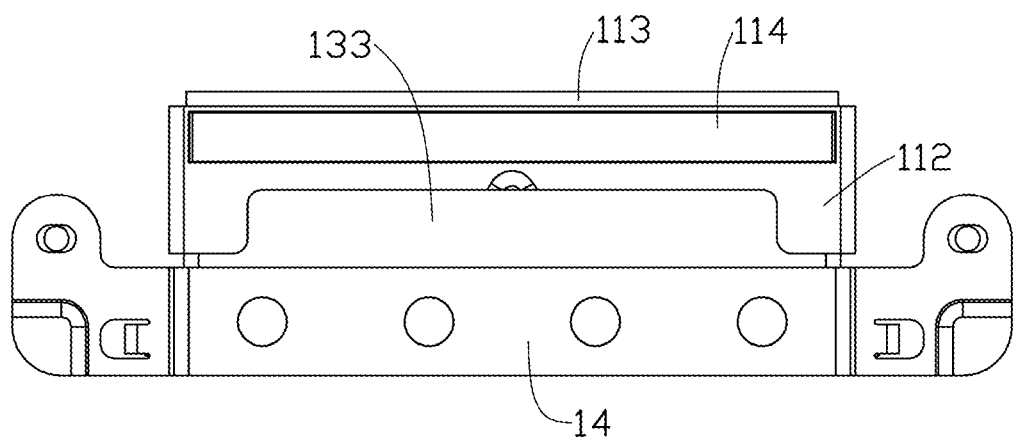
FIG. 3 is a back view of the limit device shown in FIG. 1.

The technical solutions of the present invention will be clearly and completely described below in conjunction with embodiments. Obviously, the described embodiments are a part of the embodiments of the present invention, but not all of the embodiments. Based on the embodiments of the present invention, all other embodiments obtained by those of ordinary skill in the art without creative work shall fall within the protection scope of the present invention.

As shown in FIGS. 1 to 6, an embodiment of the present application provides a limit device 1. The limiting device 1 includes a first connecting member 11, a transmission rod 12 and a second connecting member 13.

The first connecting member 11 includes a first main body 110 and two first connecting elements 111. The two first connecting elements 111 are arranged at intervals. The two first connecting elements 111 are connected to the first main body 110.

The transmission rod 12 includes a first end 121 and a second end 122, and the first end 121 and the second end 122 are arranged at intervals. The first end 121 penetrates one first connecting element 111, and the second end 122 penetrates the other first connecting element 111.

The second connecting member 13 includes two indexing buckles 130. The two indexing buckles 130 are arranged at intervals. Each indexing buckle 130 includes a first limiting groove 131 and a second limiting groove 132. The first limiting groove 131 and the second limiting groove 132 are spaced apart. The first end 121 extends into one indexing buckle 130, and the second end 122 extends into the other indexing buckle 130.

The limit device 1 includes a stop state and a non-stop state. When the limiting device 1 is in the stopping state, the first end 121 and the second end 122 are respectively disposed in the two first limiting grooves 131, and the first main body 110 is in the first position. When the limiting device 1 is in the non-stop state, the first end 121 and the second end 122 are respectively disposed in the two second limiting grooves 132, and the first main body 110 is in the second position.

The first connecting member 11 and the second connecting member 13 are movably connected. The first connecting piece 11 and the second connecting piece 13 are connected by a transmission rod 12.

The position of the first main body 110 is changed by rotating the position of the transmission rod 12.

The first end 121 and the second end 122 are respectively disposed in the two first limiting grooves 131, the first main body 110 is in the first position, and the first main body 110 is in a locked state.

The first end 121 and the second end 122 are respectively disposed in the two second limiting grooves 132, the first main body 110 is in the second position, and the first main body 110 is in a non-stop state.

When the limiting device 1 is applied, the first main body 110 can be arranged on the side of the energy storage 100 of the robot 10, that is, the limiting device 1 is an externally hung structure, so that the limiting device 1 has strong applicability.

Figure 4:
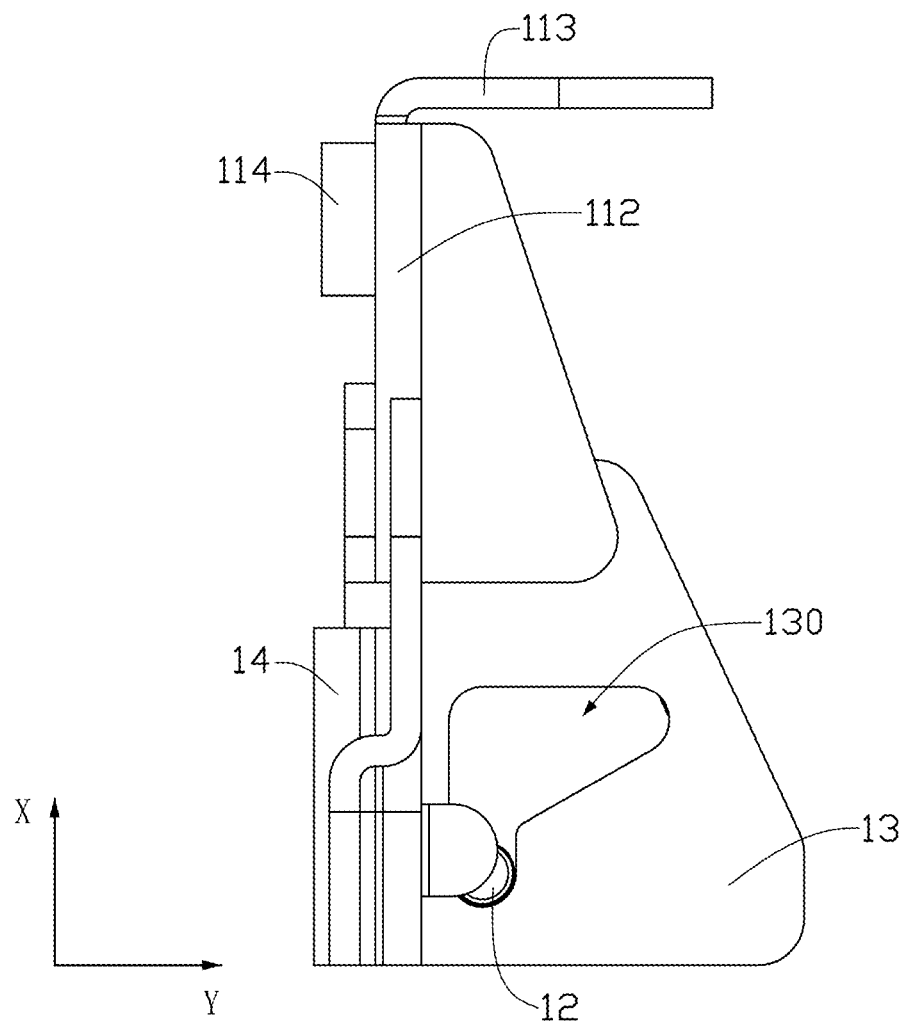
FIG. 4 is a side view of the limit device shown in FIG. 1.
Figure 5:
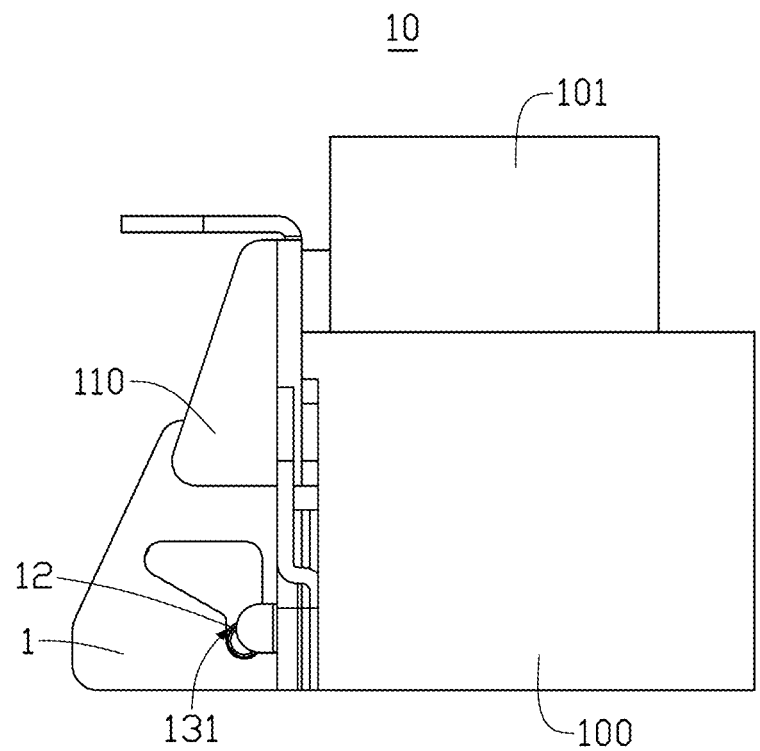
FIG. 5 is a view of the robot in a stop state according to the present disclosure.

As shown in FIGS. 4 and 5, FIG. 5 is a schematic diagram of the limiting device 1 in a stopping state. The first end 121 and the second end 122 are respectively disposed in the two first limiting grooves 131. At least part of the first main body 110 is placed vertically along the first direction X. The first main body 110 is in the first position. The first main body part 110 can be configured to block the battery component 101.

Figure 6:
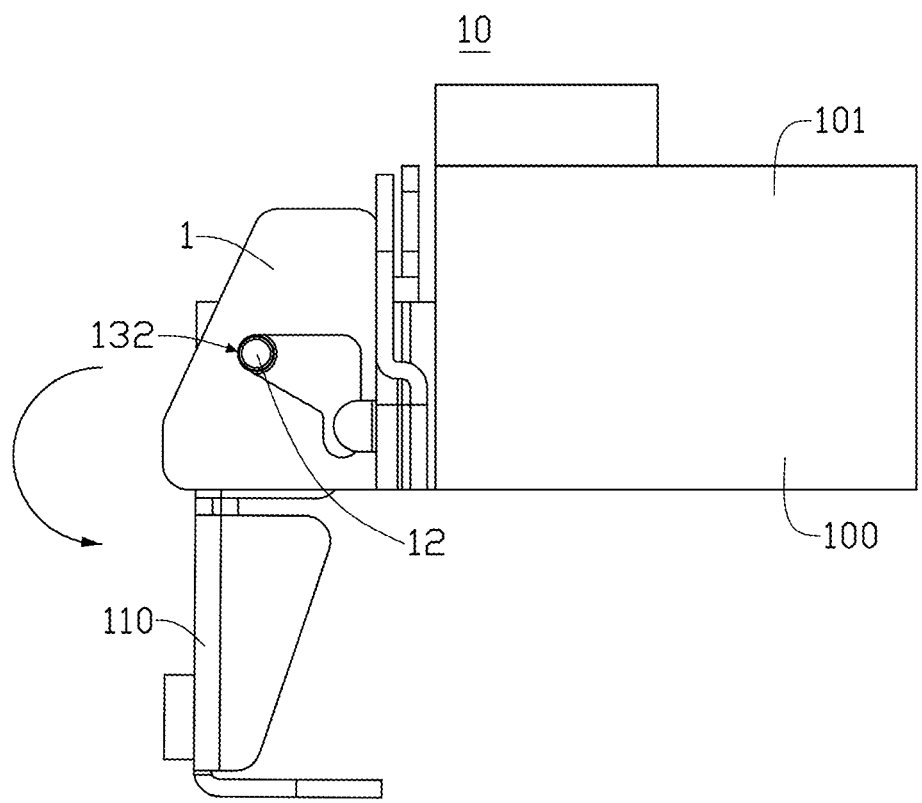
FIG. 6 is a view of the robot in a non-stop state according to the present disclosure.

As shown in FIGS. 4 and 6, FIG. 6 is a schematic diagram of the limiting device 1 in a non-stop state. The first end 121 and the second end 122 are respectively disposed in the two second limiting grooves 132. The first main body 110 is in the second position. The first main body 110 is made to unblock the battery component 101.

The limiting device 1 further includes a third connecting member 14. The second connecting member 13 is connected to the third connecting member 14. The first connecting member 11 is disposed on the side of the second connecting member 13 away from the third connecting member 14.

The third connecting member 14 is used for fixing with the robot 10. The third connecting member 14 may be a fixed plate. The middle part of the third connecting piece 14 can be configured to connect with the second connecting piece 13. Both sides of the third connecting member 14 can also be configured to connect with the robot 10.

The first main body 110 includes a first element 112 and a second element 113. The two first connecting elements 111 are arranged on opposite sides of the first element 112. The second element 113 and the first element 112 are movably connected.

The first element 112 is configured to block the movement of the battery component 101 in the battery compartment 100.

The first main body 110 also includes buffer element 114. The buffer element 114 is located on the side of the first element 112 away from the first connecting element 111. The second element 113 is located on the side of the first element 112 away from the buffer element 114.

The buffer element 114 can be an elastic part. For example, the buffer element 114 can be rubber gaskets, etc. The buffer element 114 is configured to mitigate the impact between the battery component 101 and the first main body 110.

The second connector 13 includes the second main body 133 and the second connecting element 134. The two second connecting elements 134 are located on opposite sides of the second main body 133. One of the indexing buckle 130 is located on one of the second connecting element 134.

The two first connecting elements 111 are located between the two second connecting elements 134.

The second connecting element 134 is located on the outside of the first connecting element 111. The transmission rod 12 extends from the central area of the two first connecting elements 111 to the side of the two second connecting elements 134. The transmission rod 12 runs through the first connecting element 111 and the second connecting element 134 in turn. So, the first connecting member 11 and the second connector 13 can be actively connected.

The second connecting element 134 is connected with the third connector 14. The length of the first body 110 is greater than the length of the second body 133.

So that the second connecting element 13 can be transmission rod 12 as the axis for rotation to achieve locking and release.

The first limiting groove 131 and the second limiting groove 132 are formed by the space within the indexing buckle 130 extending in two different directions, the first limiting groove 131 is set in the first direction X, and the second limiting groove 132 is set in the second direction Y.

In the second direction, the width of the first connecting member 11 is less than the width of the vertex of the second limiting groove 132 from the edge of the indexing buckle 130.

This application also provides a robot 10, including energy warehouse 100 and limit device 1. Limit device 1 is configured to lock or loose the battery component 101 located in the energy chamber 100.

What is claimed is:

1. A robot comprising:
    an energy storehouse; and
    a limit device comprising:
        a first connecting member comprising a first main body portion and two first connecting elements, wherein the two first connecting elements are arranged at intervals, and the two first connecting elements are respectively connected to the first main body, the first main body portion comprises a first element, a second element, and a buffer element, the buffer element is arranged on a side of the first element away from the first connecting element, the second element is arranged on a side of the first element away from the buffer element, and the two first connecting elements are arranged on opposite sides of the first element;
        a transmission rod comprising a first end and a second end, wherein the first end and the second end are arranged at intervals, and the first end penetrates through one of the two first connecting elements, the second end penetrates through the other one of the two first connecting element; and
        a second connecting member provided with two indexing buckles, wherein the two indexing buckles are arranged at intervals, each of the two indexing buckles comprises a first limiting groove and a second limiting groove, the first end extends into one of the two indexing buckles, and the second end extends into the other one of the two indexing buckles;
    wherein the limiting device comprises a stopping state and a non-stop state; when the limiting device is in the stopping state, the first end and the second end are respectively arranged on the two first limiting grooves, the first main body is located at a first position; when the limiting device is in the non-stop state, the first end and the second end are respectively arranged at the two second limiting grooves, the first main body is in a second position; and
    wherein the limiting device is configured to lock or loosen a battery opened in the energy storehouse.

2. The robot of claim 1, wherein the limiting device further comprises a third connecting member, the second connecting member is connected to the third connecting member, and the first connecting member is arranged on a side of the second connecting member away from the third connecting member.

3. The robot of claim 2, wherein the second connecting member comprises a second main body portion and a second connecting element, and the two second connecting elements are arranged on opposite ends of the second main body, each of the two indexing buckles is arranged on one of the two second connecting elements.

4. The robot of claim 3, wherein the two first connecting elements are arranged between the two second connecting elements.

5. The robot of claim 3, wherein the second connecting element is connected to the third connecting member, and a length of the first main body portion is greater than a length of the second main body portion.

6. The robot of claim 1, wherein the second element is movably connected to the first element.

7. The robot of claim 1, wherein the first limiting groove and the second limiting groove are formed by extending a space in the indexing buckle in two different directions, the first limiting groove is arranged along a first direction, and the second limiting groove is arranged along a second direction.

8. The robot of claim 7, wherein in the second direction, a width of the first connecting member is less than a distance between an apex of the second limiting groove and an edge of the indexing buckle.

* * * * *